(12) United States Patent
Tixhon et al.

(10) Patent No.: US 9,517,970 B2
(45) Date of Patent: Dec. 13, 2016

(54) TRANSPARENT GLASS SUBSTRATE HAVING A COATING OF CONSECUTIVE LAYERS

(75) Inventors: Eric Tixhon, Jumet (BE); Delphine Didier, Jumet (BE)

(73) Assignee: AGC GLASS EUROPE, Brussels (BE)

( * ) Notice: Subject to any disclaimer, the term of this patent is extended or adjusted under 35 U.S.C. 154(b) by 368 days.

(21) Appl. No.: 14/119,332

(22) PCT Filed: May 23, 2012

(86) PCT No.: PCT/EP2012/059552
§ 371 (c)(1),
(2), (4) Date: Nov. 21, 2013

(87) PCT Pub. No.: WO2012/160075
PCT Pub. Date: Nov. 29, 2012

(65) Prior Publication Data
US 2014/0087101 A1 Mar. 27, 2014

(30) Foreign Application Priority Data
May 24, 2011 (BE) .................................. 2011/0317

(51) Int. Cl.
| C03C 17/34 | (2006.01) |
| E06B 3/66 | (2006.01) |
| C03C 17/36 | (2006.01) |
| B32B 17/10 | (2006.01) |
| E06B 3/67 | (2006.01) |

(52) U.S. Cl.
CPC ....... *C03C 17/3417* (2013.01); *C03C 17/3435* (2013.01); *C03C 17/366* (2013.01); *E06B 3/66* (2013.01); *B32B 17/1022* (2013.01); *B32B 17/10211* (2013.01); *C03C 2217/94* (2013.01); *E06B 3/6715* (2013.01); *Y10T 428/24975* (2015.01)

(58) Field of Classification Search
CPC ............ E06B 3/66; E06B 3/67; E06B 3/6715; Y02B 8/22; Y02B 8/24; C03C 17/3417; C03C 17/3435; C03C 2217/94; B32B 17/10211; B32B 17/1022
See application file for complete search history.

(56) References Cited

U.S. PATENT DOCUMENTS

| 4,419,386 A | 12/1983 | Gordon |
| 5,342,676 A | 8/1994 | Zagdoun |
| 5,935,716 A | 8/1999 | McCurdy et al. |
| 6,174,599 B1 | 1/2001 | Boire et al. |
| 6,354,109 B1 | 3/2002 | Boire et al. |
| 2007/0116966 A1* | 5/2007 | Mellott ............... C03C 17/3417 428/432 |
| 2008/0216399 A1 | 9/2008 | Kiyohara et al. |

FOREIGN PATENT DOCUMENTS

| EP | 0 544 577 | 6/1993 |
| EP | 1 872 652 | 1/2008 |
| WO | 99 02338 | 1/1999 |
| WO | 02 48064 | 6/2002 |

OTHER PUBLICATIONS

International Search Report Issued Jun. 28, 2012 in PCT/EP12/059552 Filed May 23, 2012.

\* cited by examiner

*Primary Examiner* — Donald J Loney
(74) *Attorney, Agent, or Firm* — Oblon, McClelland, Maier & Neustadt, L.L.P.

(57) ABSTRACT

The invention relates to a transparent glass substrate having a coating including, in order: a first reflected color neutralization layer; a low-emissivity second layer essentially made up of SnO2:F and having a thickness between 455 and 800 nm; and a third layer that is essentially made up of SiOx, x being less than or equal to 2, and has a thickness between 40 and 65 nm or between 140 and 180 nm. The invention also relates to a double glass sheet and a triple glass sheet, manufactured from such a glass substrate, and to a window comprising said glass sheets.

19 Claims, No Drawings

TRANSPARENT GLASS SUBSTRATE HAVING A COATING OF CONSECUTIVE LAYERS

The present invention relates to a transparent substrate coated with successive layers, of which at least one is a low-emissivity layer, referred to as low-E layer, wherein the lamination structure has high solar factor values. The substrate thus coated forms a functional glass structure typically comprising at least one double glazing unit.

It is known to form various lamination structures comprising successive layers of compounds that are based in particular on metals or semiconductors and oxides, nitrides, oxynitrides thereof on a transparent substrate such as glass for specific optical and electrical effects. Thus, one can quote as examples lamination structures for solar applications such as photovoltaic applications, for architectural applications, for which reflective and antireflective properties and a low or high solar factor are sought, while also exhibiting stability of colour whatever the observation angle, for automotive applications, for domestic uses such as oven doors etc.

Examples of multilayered structures on a glass substrate include lamination structures that provide low-E properties as a result of compounds such as $SnO_2$:F, $SnO_2$:Sb, ITO (tin-doped indium oxide) or metals such as silver. It can also be advantageous to include between the substrate and the low-E functional layer a layer that, on the one hand, prevents the migration of sodium ions from the glass to reduce irritation and, on the other hand, the generation of a variation in colours in reflection at different observation angles of the coated glass.

For architectural requirements, i.e. for houses or buildings provided with windows, it appears that glass substrates are subject to certain environmental requirements such as a solar factor (SF or g) that is as high as possible while also minimising the emissivity (E) in the far infrared range (IR), i.e. for wavelengths higher than 2500 nm. Such glazed structures, in particular double glazing units provided with a low-emissivity layer, thus provide a double function: a highly satisfactory thermal insulation and retention of the heat in a building because of the low-E layer, and a "free" supply of energy associated with the high SF. Worthy of mention as examples here are glass substrates:clear glass—$SiO_x$—$SnO_2$:F, the performance values of which are such that the emissivity is as low as 0.1 and the SF is about 73% for a double glazing unit, in which one of the glass substrates is coated with these layers. The sub-layer of $SiO_x$ is used in this case to prevent the migration of sodium ions from the glass and also to allow the neutralisation of colour in reflection of the coated glass, i.e. to prevent interferential colours in reflection.

Another parameter that must be considered is the energy-saving performance of a window in its entirety formed from a glazing unit and an appropriate frame, defined by the acronym "WER"—"window energy rating". Windows such as those based on double glazing can also be graded according to a degree of energy-saving performance represented by letters from A to G, "A label" being the most efficient performance. For example, the WER can be calculated for a double glazing unit fitted with a support frame for the glass according to criteria outlined by the British Fenestration Rating Council—BFRC (London, United Kingdom). According to the BFRC evaluation of the WER is achieved on the basis of the following formula:

$$WER(kWh/m^2/year) = (218.6 \times g) - 68.5 \times (U+L),$$
wherein g=SF: solar factor of the window;
U(window)=the thermal coefficient ($W/m^2 \cdot K$) of the window including the support frame and the glazing;
L: the heat loss associated with the passage of air through the window ($W/m^2 \cdot K$).

Consequently, positive WER values demonstrate a saving of kWh (kilowatt hours) per square meter of window per year and negative values indicate that the window causes energy consumption. According to this formula an A label window has a positive WER, a B label is used for windows having a WER in the range of between −10 and 0, G label indicates that a window has a WER of less than −70. A label is highly recommended for windows intended for the British market.

Patent application WO 94/25410 describes glazing units comprising a glass substrate provided with a thin functional layer, which thin functional layer in particular has low emissivity properties and the choice of its colour in reflection on the layer side lies in the blue scale. This document describes lamination structures comprising: (i) an inside coating that is placed directly on the glass, is based on silicon oxynitrides or oxycarbides or based on metal oxides such as $TiO_2$, $SnO_2$ and ZnO, has refractive indices in the range of between 1.65 and 1.90, has a thickness that varies between 70 and 135 mm; (ii) a functional layer that has a refractive index close to 2, a thickness in the range of between 300 and 450 nm and is for example composed of $SnO_2$:F; and (iii) an outside layer that is located on the functional layer and is composed of $SiO_2$ in particular, has a thickness that varies between 70 and 110 nm and a refractive index between 1.40 and 1.70. A substrate coated in this way and assembled in a double glazing unit has a light reflection of at most 15%, a colour in reflection in the blue scale, in particular between 465 and 480 nm, and a purity in reflection on the layer side of at most 5%.

U.S. Pat. No. 6,174,599 B1 describes glazing units comprising a glass provided with a thin functional layer, which thin functional layer in particular has low emissivity properties and the choice of its colour in reflection on the layer side lies in the blue scale. This document describes lamination structures comprising: (i) an inside coating that is placed directly on the glass, is based in particular on silicon oxide, silicon oxycarbide or silicon oxynitride having a gradient refractive index; (ii) a functional layer that has a refractive index of between 1.8 and 2, a thickness of between 350 and 550 mm and is composed of $SnO_2$:F, for example; and (iii) an outside layer that is located on the functional layer and is composed of $SiO_2$ in particular, has a thickness that varies between 70 and 120 nm and a refractive index between 1.4 and 1.7. A substrate coated in this way has a light transmission of at least 75%, a colour in reflection in the blue scale and an emissivity of at most 0.18.

One of the aims of the invention is to provide a transparent glass substrate coated with layers, wherein the assembly forms a lamination structure, and said glass substrate forms part of a double or triple glazing unit. Thus, such a double or triple glazing unit does not seek to simply optimise one of its properties, but meets the compromise of neutral colour in reflection and stability of colour whatever the observation angle, with low emissivity, advantageously of less than or equal to 0.12 and the highest SF possible, enabling a positive WER to be obtained for a window based on such a glazing placed in an appropriate frame to achieve these WER values.

It is also necessary that the glazing exhibits a haze of less than 1%, or even less than 0.6%, in order to prevent an undesirable "milky" appearance.

The invention thus relates to a transparent glass substrate having a coating comprising, in the following order:
- a first layer for neutralising colours in reflection,
- a second layer with low emissivity consisting essentially of $SnO_2:F$ with a thickness in the range of between 455 and 800 nm, and
- a third layer consisting essentially of $SiO_x$, where x is less than or equal to 2, with a thickness in the range of between 40 and 65 nm or between 140 and 180 nm.

The Applicant has shown that, because of the choice of materials forming the layers of the lamination structure of a transparent glass substrate and their thickness, double glazing units can be formed that achieve enhanced performances in terms of solar factor, WER, emissivity and at the same time a stability of neutral colour at different observation angles. SF values of at least 73%, and even close to 75% or even higher, or up to 81%, can be reached for the glazing with an E value of less than or equal to 0.12, and thus enable a positive WER to be obtained. At the same time, the neutrality of colour at various observation angles can be retained with $a^*<0$, advantageously $-1 \leq a^* \leq -3$, and $b^*<5$, preferably $-6 \leq b^* \leq 5$, advantageously $-5 \leq b^* \leq 5$ and particularly advantageously $-2 \leq b^* \leq 2$ (values in reflection at an observation angle in the range between 8° and 55°—illuminant D65), which is also the case with a triple glazing unit. These values of $a^*$ and $b^*$ allow a neutrality of colour in reflection to be retained, i.e. slight reflections, the desired tint of which is yellowish-green or blue-green, are allowed, while preventing an undesirable, aesthetically unacceptable red reflection, and to give the glazing a stability of colour in reflection whatever the observation angle that is measured by $\Delta a^*b^*$ with the value of 3.5 at most (see below). In the framework of the invention, neutrality and stability in reflection are observed or measured in relation to the external side of a building, i.e. from the "P1" side. A person skilled in the art will find all the details and all information relating to the measurements of $a^*$ and $b^*$ in the technical literature, in particular based on the work by Ray G. Gordon and R. S. Hunter, as described in U.S. Pat. No. 4,377,613, U.S. Pat. No. 4,187,336 and U.S. Pat. No. 4,419,386. Moreover, the haze values can be kept as low as possible, to less than 1% or even lower than 0.6%. However, to obtain the above E values, it is necessary to have thicknesses of $SnO_2:F$, as claimed, which can unfortunately go against the desired low haze values. Consequently, to achieve these, the method of depositing the $SnO_2:F$ includes an inorganic acid present in the precursors such as HCl or $HNO_3$, the effect of which is to "level off" or smooth down the roughness of this layer in accordance with the instruction of WO 2010/107998.

One of the advantages of the invention, in particular in the case of double glazing or triple glazing units, is to enable these performances to be achieved without having to resort to one or more extra clear glasses, which are known to increase the SF, and/or without using krypton or xenon as filling gas in these double glazing units, which are known to reduce U.

The Applicant has therefore shown that in order to achieve these objectives it was necessary to choose, inter alia, a thickness of $SiO_x$ layer (the third layer) that would enable the SF to be increased while allowing a neutrality or stability of colour in reflection. Moreover, to achieve the lowest possible U(double glazing) values, i.e. typically lower than or equal to 1.4 $W/m^2 \cdot K$, it is necessary to resort to the $SnO_2:F$ thicknesses according to the invention. In more general terms, it is actually the combination of particular layers with specific thickness ranges that enables this objective to be achieved, since optimisation of a given parameter such as the SF, E of colour stability has an influence on the performances of other parameters. It is also required that the lamination structures can be produced on an industrial scale and advantageously in series at the molten tin bath or in the lehr located downstream of the tin bath zone, with optimised implementation of operations, in particular without additional prohibitive costs and without significant fouling of the reactors.

Windows fitted with such glazing units, double or triple glazing, and with reference frames that typically represent 25% of the area of the window and with a frame U of at most 1.2 $W/m^2 \cdot K$ have WER A labels with values of $a^*<0$ and $b^*<5$ in reflection. A person skilled in the art will select the appropriate frame while additionally being mindful that the effects of the invention are linked to the layers and their thicknesses. Within the framework of the invention window must be understood in its broadest sense, i.e. it can be used equally well in domestic and industrial buildings or even as glazed facade elements of buildings, i.e. VEA type elements (external attached glazing).

The solar factor (SF) is measured in accordance with standard EN 410.

Values $a^*$ and $b^*$ are obtained according to the $L^*a^*b^*$ colorimetric system established by the CIE (International Commission on Illumination) with standard illuminant D65, which represents a state of daylight with a colour temperature equivalent to 6500 K.

The three components $L^*$, $a^*$ and $b^*$ are commonly represented by a three-dimensional space. Component $L^*$, which is purity, is represented by a vertical axis that goes from 0 (black) to 100 (white). In the horizontal plane component $a^*$ represents on one axis the range of colours ranging from red (positive $a^*$) to green (negative $a^*$) passing through grey ($a^*=0$) and component $b^*$ represents on a second axis the range of colours ranging from yellow (positive $b^*$) to blue (negative $b^*$) passing through grey ($b^*=0$).

When the values of $a^*$ and $b^*$ in reflection are low, the colour is considered to be neutral. In addition to neutrality, the building market demands colours in reflection that avoid values of $a^* \geq 0$.

The angular colour stability, additionally neutral, is established by the measurement of $\Delta a^*b^*$ in reflection. The lower this value is, the more the colour neutrality is maintained at various observation angles. This measurement of $\Delta a^*b^*$ is an average value resulting from those established for each observation angle of 8°, 20°, 30°, 45° and 55°. Hence, $$\Delta a^*b^*_{(20°)}:[(a^*_{8°}-a^*_{20°})^2+(b^*_{8°}-b^*_{20°})^2]^{1/2}$$

$$\Delta a^*b^*_{(30°)}:[(a^*_{8°}-a^*_{30°})^2+(b^*_{8°}-b^*_{30°})^2]^{1/2}$$

$$\Delta a^*b^*_{(45°)}:[(a^*_{8°}-a^*_{45°})^2+(b^*_{8°}-b^*_{45°})^2]^{1/2}$$

$$\Delta a^*b^*_{(55°)}:[(a^*_{8°}-a^*_{55°})^2+(b^*_{8°}-b^*_{55°})^2]^{1/2}$$

The observation angle $\alpha$ (8°-55°) is the angle of inclination of the glazing measured in relation to an axis perpendicular to the glazing ($\alpha=0°$). The values $\Delta a^*b^*$ for double and triple glazing units are advantageously 3.5 at most and preferably 3 at most.

Double glazing units comprising a lamination structure of the invention are those classically used in the architectural field, glazed substrates separated from one another by a space of 14-17 mm, said space being filled with a rare gas such as argon. The transparent substrate advantageously represents a clear or extra clear glass of various thicknesses, typically in the range of between about 3.8 mm and 8 mm.

Extra clear glass is understood to mean a glass having a maximum iron content, expressed in the form of $Fe_2O_3$, of less than 0.04% by weight, in particular less than 0.02% by weight. Clear glass is understood to mean a glass having a maximum iron content, expressed in the form of $Fe_2O_3$, ranging from 0.04% to 0.4% by weight.

The purpose of the first layer is to allow neutralisation of the colour in reflection of the coated glass, i.e. to prevent interferential colours in reflection. It is preferably in direct contact with the glass substrate and is advantageously a mono-layer essentially consisting of silicon oxynitrides, $SiO_xN_y$, or silicon oxycarbides, $SiO_xC_y$, wherein x is less than 2, the refractive index thereof is in the range of 1.65-1.75, and the thickness of this layer is in the range of between 55 and 95 nm, advantageously between 60 and 90 nm and most advantageously between 70 and 90 nm. The values of "x" and "y" are chosen to adjust the refractive index values. In general, the latter variant of neutralisation layer is designated by $SiO_x$, wherein x is less than 2.

Also, the first neutralisation layer can be a mixed layer formed mainly from oxides of Sn and Si, the thickness of which is in the range of between 55 and 95 nm, advantageously between 60 and 90 nm and most advantageously between 70 and 90 nm.

In other embodiments the first neutralisation layer can in turn be a dual layer consisting of a layer of $TiO_2$ arranged on the glass substrate, which is coated with a layer of silicon oxide, silicon oxycarbide, $SiO_xC_y$, or silicon oxynitride, $SiO_xN_y$, wherein x is less than or equal to 2 and the thickness of the $TiO_2$ is preferably 5-15 nm and that of a silicon oxide, oxycarbide or oxynitride is 15-40 nm.

Still as a variant, the first neutralisation layer can be a dual layer formed from a layer of $SnO_2$ or ZnO arranged on the glass substrate, which is coated with a layer of silicon oxide, silicon oxycarbide, $SiO_xC_y$, or silicon oxynitride, $SiO_xN_y$, wherein x is less than or equal to 2 and the thickness of the $SnO_2$ or ZnO is preferably 15-35 nm and that of a silicon oxide, oxycarbide or oxynitride is 15-40 nm.

The second layer, with low emissivity, which in the preferred embodiments is located directly on top of the first neutralisation layer, is essentially consisting of $SnO_2$:F, has an emissivity E that is lower than or equal to 0.12, preferably lower than or equal to 0.1, and has a thickness in the range of between 455 and 800 nm and most advantageously between 455 and 740 nm. Such a layer is produced by classically used technologies such as CVD. This is the layer that gives the glazing the low emissivity values. In particular embodiments the $SnO_2$:F can additionally be doped with zirconium oxide. In this case, the atomic percent of zirconium (at % Zr) in the layer is in the range of between 0.3 at % and preferably between 0.5 at % and 2.0 at %.

The third layer, which according to preferred embodiments is arranged on top of the second layer, with low emissivity, is advantageously a silicon oxide, oxycarbide or oxynitride, thus advantageously belonging to the definition $SiO_x$, preference being given to $SiO_2$. The refractive indices are preferably in the range of between 1.3 and 1.6. The material of the third layer has the advantage of not being absorbent and has a low refractive index, and in the glazing of the invention this enables the light reflection (LR) to be significantly reduced, which increases the SF. However, the range of thicknesses providing the most significant reduction in reflection can cause a poor angular stability of colours in reflection. The best compromise has thus been found for a thickness of this layer in the range of between 40 and 65 nm or between 140 and 180 nm. The thickness of this layer is preferably in the range of between 40 and 60 nm, most advantageously between 45 and 60 nm. Although thicknesses between 140 and 180 nm enable the desired effects to be obtained, this range is nevertheless less preferred because of the technical difficulties of using such thicknesses and the appreciable risk of fouling the reactors.

It should be noted that within the framework of the invention all the layers forming the lamination structure are classically obtained using chemical and/or physical deposition methods such as CVD (chemical vapour deposition), PECVD (plasma enhanced chemical vapour deposition) and magnetron sputtering or a combination thereof. These layers can be deposited on-line thanks to treatment devices classically used in so-called float glass technology.

As an example, the first layer, neutralisation layer, and the third layer can be deposited by chemical deposition (CVD) starting from precursors in gaseous form containing, for example, silane ($SiH_4$), an oxidising gas such as oxygen or carbon dioxide ($CO_2$), ethylene, if necessary, and nitrogen as vector gas, wherein the gas fluxes are directed onto the hot surface of the glass. The proportions of each precursor allow the deposition, for example, of $SiO_x$, wherein x is less than or equal to 2. A skilled person can refer to patent applications WO 2010/107998, U.S. Pat. No. 7,037,555 or FR 2 666 325 without being exhaustive.

The layers of $SnO_2$ or $SnO_2$:F respectively used in the first layer, neutralisation layer, on glass and to form the second layer of low emissivity are also prepared in a manner known to the skilled person, preference being given to CVD. Using CVD this layer is typically formed by means of tin precursors that can be organometallic derivatives such as monobutyl tin trichloride (MBTC) or inorganic derivatives such as tin tetrachloride ($SnCl_4$), air, water in the form of vapour, oxygen, and for the $SnO_2$:F layer, a fluorinated source for doping such as HF or trifluoroacetic acid, and if need be $HNO_3$ in particular for reduction of the haze (WO 2010/107998). These gaseous precursors are advantageously directed and deposited on-line onto the hot glass.

The deposits of $TiO_2$ that form part of the first layer, neutralisation layer, on glass are preferably performed using CVD techniques. Precursors based on organic or inorganic derivatives of titanium such as TTiP (titanium tetraisopropoxide) or $TiCl_4$ are used in the CVD instead of the abovementioned tin and silane derivatives, as described in WO99/48828.

According to highly advantageous embodiments the invention relates to a double glazing unit comprising two transparent glass substrates, one of which is a glass substrate bearing a coating of the invention that has a U of ≤1.4 $W/m^3·K$, an emissivity of less than or equal to 0.12, preferably less than or equal to 0.1, and a solar factor value of at least 73%, advantageously of at least 75% and in particular in the range of between 75% and 81%. Such double glazing units have been described above and are generally those available on the market. In such glazing units a single glass substrate is covered with the lamination structure of the invention, which is usually placed in "P3" position, i.e. on the innermost glass substrate with the layers directed towards the outside. In this case the WER also has positive values, and this is only possible when permitted by an appropriate frame typically representing 25% of the surface area of the window, wherein the U of the frame is at most 1.2 $W/m^3·K$. A reference frame is defined here as one representing 25% of the surface area of the window and with a U of the frame of at most 1.2 $W/m^3·K$.

Working from this double glazing unit, a window is provided that comprises a reference frame as defined here and a double glazing unit of the invention that has a WER with values higher than or equal to zero, in particular in the range of between 1 and 10 kWh/m²/year.

According to other embodiments the invention relates to a triple glazing unit having three transparent glass substrates, at least one of which is a glass substrate bearing a coating of the invention that has a U of ≤1.1 W/m³·K, an emissivity of less than or equal to 0.12 and a solar factor value of at least 64%, wherein these are usually in "P5" position, i.e. on the innermost glass substrate with the layers directed towards the outside, and the two other substrates are outermost.

In the case where two of the three glass substrates are coated with layers according to the invention, these are usually in P2 and P5 positions. In this case the WER likewise has positive values, and this is only possible when permitted by an appropriate frame typically representing 25% of the surface area of the window, wherein the U of the frame is at most 1.2 W/m³·K. It is highly advantageous that SF values in the range of between 64% and 75% can be reached.

Working from this triple glazing unit, a window is provided that comprises a reference frame as defined here and a double glazing unit of the invention that has a WER with values higher than or equal to zero, in particular in the range of between 1 and 10 kWh/m²/year.

As indicated above, the double or triple glazing unit has a colour neutrality at various observation angles with colours in reflection at an observation angle in the range of between 8° and 55°—illuminant D65, of a*<0, advantageously −1≤a*≤−3, and b*<5, preferably −6≤b*≤5, advantageously −5≤b*≤5 and most advantageously −2≤b*≤2. The values of Δa*b* for the double and triple glazing units are advantageously 3.5 at most and preferably 3 at most.

This does not rule out the possibility of the other glass substrates in these double or triple glazing units, i.e. those not coated with layers of the invention, in turn being coated with other layers of specific substrates such as antireflective layers. Similarly, the possibility of the substrate coated with layers of this invention also bearing antireflective layers on the face opposed to that coated with the layer of the invention is not ruled out.

According to another aspect, the invention relates to the use in a double glazing unit comprising two transparent glass substrates, one of which is a glass substrate having a coating comprising, in the following order: a first layer for neutralising colours in reflection, a second layer with low emissivity essentially consisting of $SnO_2$:F with a thickness in the range of between 455 and 800 nm, and a third layer essentially consisting of $SiO_x$, where x is less than or equal to 2, with a thickness in the range of between 40 and 65 nm or between 140 and 180 nm, to provide solar factor values of at least 73%, an emissivity value of less than or equal to 0.12, wherein the glazing has a thermal coefficient, U, lower than or equal to 1.4 W/m²·K. It is highly advantageous that the SF values range between 75% and 81%.

According to another aspect, the invention relates to the use in a triple glazing unit comprising three transparent glass substrates, one of which is a glass substrate having a coating comprising, in the following order: a first layer for neutralising colours in reflection, a second layer with low emissivity essentially consisting of $SnO_2$:F with a thickness in the range of between 455 and 800 nm, and a third layer essentially consisting of $SiO_x$, where x is less than or equal to 2, with a thickness in the range of between 40 and 65 nm or between 140 and 180 nm, to provide solar factor values of at least 64%, an emissivity value of less than or equal to 0.12, wherein the glazing has a thermal coefficient, U, lower than or equal to 1.1 W/m²·K. It is highly advantageous that the SF ranges between 65% and 75%.

Advantageously, when said coating comprising the layers of the invention is used in a double or triple glazing unit, this unit has a colour neutrality at various observation angles with values in reflection at an observation angle in the range of between 8° and 55°—illuminant D65, of a*<0, advantageously −1≤a*≤−3, and b*<5, preferably −6≤b*≤5, advantageously −5≤b*≤5 and most advantageously −2≤b*≤2. The values of Δa*b* for the double and triple glazing units are advantageously 3.5 at most and preferably 3 at most.

The following examples illustrate the invention without limiting its scope.

EXAMPLES 1-9

A double glazing unit was formed that comprises two substrates of clear glass, each with a thickness of 4 mm, that are separated 15 mm from one another with a filling of 90% argon. One of the substrates is coated with $SiO_x$, where x is less than 2, then with $SnO_2$:F and finally with $SiO_2$. This double glazing unit is then inserted into an insulating frame that represents 25% of the surface area of the window and has a U of 1.2 W/m³·K, and the value of L of the window is fixed at 0.03 W/m³·K.

The respective thicknesses of the layers have been varied. The results in terms of SF, a* and b*, colour in reflection and angular stability of the colour in reflection are indicated in Table 1 below. The SF values are measured in accordance with standard EN 410. The values for a* and b* are given for three observation angles: 8°, 30° and 55°, and are measured according to the standard illuminant D65.

Table 2 shows the results relating to haze, E (emissivity), U (double glazing) and WER (window).

TABLE 1

| Example | $SiO_x$ (nm) | $SnO_2$:F (nm) | $SiO_2$ (nm) | SF (%) | a* 8° 30° 55° | b* 8° 30° 55° | Colour in reflection | Δa*b* (30°) | Δa*b* (55°) |
|---|---|---|---|---|---|---|---|---|---|
| 1 | 74 | 456 | 43 | 75 | −1.1; −0.7; −1.5 | 1.9; 2.0; 0.8 | yellowish-green | 0.41 | 1.17 |
| 2 | 60 | 740 | 60 | 76 | −0.9; −0.4; −0.1 | 3.3; 1.9; 2.2 | yellowish-green | 1.49 | 1.36 |
| 3 | 88 | 519 | 162 | 75 | −3.2; −2.9; −1.9 | −2.7; 0.0; −4.4 | blue-green | 2.72 | 2.14 |

TABLE 1-continued

| Example | SiO$_x$ (nm) | SnO$_2$:F (nm) | SiO$_2$ (nm) | SF (%) | a* 8° 30° 55° | b* 8° 30° 55° | Colour in reflection | Δa*b* (30°) | Δa*b* (55°) |
|---|---|---|---|---|---|---|---|---|---|
| 4 | 92 | 574 | 44 | 75 | −0.8; −0.5; −0.3 | 1.9 2.0 1.0 | yellowish-green | 0.32 | 1.03 |
| 5 | 93 | 624 | 44 | 75 | −0.1; −0.6; −1.0 | 1.9; 5.0; 0.6 | yellowish-green | 3.14 | 1.58 |
| 6 | 75 | 460 | 65 | 76 | −0.3; −0.5; −1.3 | 3.2; 4.3; 1.6 | yellowish-green | 1.1 | 1.9 |
| 7 | 75 | 460 | 155 | 75 | −3.7; −2.2; −0.5 | −4.9; −6.6; −4.0 | blue-green | 2.2 | 3.4 |
| 8 | 75 | 745 | 65 | 76 | −0.4; −0.3; −0.1 | 3.0; 3.7; 2.2 | yellowish-green | 0.7 | 0.9 |
| 9 | 75 | 745 | 140 | 75 | −2.0; −2.0; −0.9 | −6.5; −5.3; −3.6 | blue-green | 1.2 | 3.1 |

TABLE 2

| Example | SiO$_x$ (nm) | SnO$_2$:F (nm) | SiO$_2$ (nm) | Haze (%) | E | U(double glazing) 4 mm/15 mm-90% Ar/4 mm (W/m$^2$ · K) | WER (kWh/m$^2$/year) |
|---|---|---|---|---|---|---|---|
| 1 | 74 | 456 | 43 | 0.4 | 0.10 | 1.36 | +1.0 |
| 2 | 60 | 740 | 60 | 0.7 | 0.07 | 1.26 | +7.6 |
| 3 | 88 | 519 | 162 | 0.5 | 0.09 | 1.32 | +3.0 |
| 4 | 92 | 574 | 44 | 0.5 | 0.09 | 1.32 | +3.0 |
| 5 | 93 | 624 | 44 | 0.6 | 0.08 | 1.29 | +4.6 |
| 6 | 75 | 460 | 65 | 0.4 | 0.10 | 1.36 | +2.5 |
| 7 | 75 | 460 | 155 | 0.4 | 0.10 | 1.36 | +1.0 |
| 8 | 75 | 745 | 65 | 0.7 | 0.07 | 1.26 | +7.6 |
| 9 | 75 | 745 | 140 | 0.7 | 0.07 | 1.26 | +6.1 |

The results of Table 1 show that Examples 1, 2, 4 and 8 are those where the best stability is achieved, while providing very acceptable hues of colour in reflection, since they avoid reflection in the red range. In the case of Examples 3, 5, 6, 7 and 9 the colour in reflection is highly acceptable, however the stability here is slightly less favourable, although it remains within the desired performance limits for the glazing. Production on an industrial scale is the most favourable in Examples 1 and 6. Hence, a good compromise has been sought between the materials of the layers and their relative thicknesses, on the one hand, and the feasibility on an industrial scale (productivity gains, costs, ease of production etc.), on the other hand.

The results of Table 2 clearly indicate the performance levels achieved for these double glazing units, in particular in terms of the WER, which are all positive.

Glazing systems available on the market will be firstly looked at for the purposes of comparison. Example A: glass/SiO$_x$/SnO$_2$:F (300 nm) and Example B: glass/SiO$_x$/SnO$_2$:F (450 nm). Table 3 gives the values for SF, emissivity and WER for double glazing units produced from such lamination structures.

TABLE 3

| Example | SiO$_x$ (nm) | SnO$_2$:F (nm) | SiO$_2$ (nm) | E | U(double glazing) 4 mm/15 mm-90% Ar/4 mm (W/m$^2$ · K) | SF (%) | WER (kWh/m$^2$/year) |
|---|---|---|---|---|---|---|---|
| A | 75 | 320 | 0 | 0.15 | 1.50 | 72.6 | −9.8 |
| B | 75 | 450 | 0 | 0.10 | 1.36 | 72.7 | −2.4 |

The results of measurements of these parameters show that the desired properties were not obtained as the WER values are negative.

Lamination structures having a layer of SiO$_x$, where x is less than 2, on the glass, then a layer of SnO$_2$:F and then a layer of SiO$_2$ that does not, however, form part of the invention, will now be looked at for purposes of comparison. Table 4 shows the results in terms of SF, a* and b*, colour in reflection and angular stability of colour in reflection for double glazing units produced from such lamination structures.

TABLE 4

| Example | SiO$_x$ (nm) | SnO$_2$:F (nm) | SiO$_2$ (nm) | SF (%) | a* 8° 30° 55° | b* 8° 30° 55° | Colour in reflection | Δa*b* (30°) | Δa*b* (55°) |
|---|---|---|---|---|---|---|---|---|---|
| C | 75 | 460 | 70 | 77 | -0.0; -0.5; -1.3 | 2.8; 4.3; 1.7 | orange | 1.6 | 1.7 |
| D | 75 | 460 | 120 | 76 | -0.3; -1.6; -0.3 | -7.3; -5.2; -1.7 | blue-green | 2.4 | 5.6 |
| E | 75 | 745 | 70 | 76 | -0.2; -0.2; 0.0 | 2.7; 3.6; 2.3 | yellowish-green | 0.9 | 0.5 |
| F | 75 | 745 | 120 | 76 | -0.5; -1.2; -0.1 | -6.6; -4.3; -1.7 | blue-green | 2.4 | 5.0 |

Examples C and F, despite showing a very small difference in thickness of the SiO$_2$ layer in relation to Examples 6 and 8, have unacceptable colours in reflection.

Examples D, despite exhibiting quite acceptable colours in reflection, exhibit colour variations that are too significant. Example E exhibits acceptable colours in reflection at 8°, but the value for a* shifts to 0 for an angle of 55°.

EXAMPLES 10-14

A triple glazing unit was formed that comprises three substrates of clear glass, each with a thickness of 4 mm, that are separated 15 mm from one another with a filling of 90% argon. One of the substrates, in position P5, is coated with SiO$_x$C$_y$, where x is less than 2, with a refractive index of 1.69, then with SnO$_2$:F and finally with SiO$_2$. This triple glazing unit is then inserted into an insulating frame that represents 25% of the surface area of the window and has a U of 1.2 W/m$^3$·K, and the value of L of the window is fixed at 0.03 W/m$^3$·K.

The respective thicknesses of the layers have been varied. The results in terms of SF, a* and b*, colour in reflection are indicated in Table 5 below. The SF values are measured in accordance with standard EN 410. The values for a* and b* are given for three observation angles: 8°, 30° and 55°, and are measured according to the standard illuminant D65.

Table 6 shows the results relating to haze, E, U (triple glazing) and WER (window).

TABLE 5

| Example | SiO$_x$ (nm) | SnO$_2$:F (nm) | SiO$_2$ (nm) | SF (%) | a* 8°; 30°; 55° | b* 8°; 30°; 55° | Colour in reflection |
|---|---|---|---|---|---|---|---|
| 10 | 74 | 456 | 43 | 66 | -1.4; -1.4; -1.7 | 1.3; 1.8; 0.5 | yellowish-green |
| 11 | 60 | 740 | 60 | 67 | -1.3; -1.1; -0.9 | 2.0; 1.6; 1.3 | yellowish-green |
| 12 | 88 | 519 | 162 | 66 | -3.0; -2.8; -1.9 | -1.9; 0.5; -2.5 | blue-green |
| 13 | 92 | 574 | 44 | 66 | -1.2; -1.2; -1.0 | 1.2; 1.8; 0.6 | yellowish-green |
| 14 | 93 | 624 | 44 | 66 | -0.8; -1.3; -1.4 | 1.2; 3.9; 0.4 | yellowish-green |

TABLE 6

| Example | SiO$_x$ (nm) | SnO$_2$:F (nm) | SiO$_2$ (nm) | Haze (%) | Emissivity | U(triple glazing) 4 mm/15 mm-90% Ar/4 mm (W/m$^2$ · K) | WER (kWh/m$^2$/year) |
|---|---|---|---|---|---|---|---|
| 10 | 74 | 456 | 43 | 0.4 | 0.10 | 1.05 | +3.6 |
| 11 | 60 | 740 | 60 | 0.7 | 0.07 | 0.98 | +8.7 |
| 12 | 88 | 519 | 162 | 0.5 | 0.09 | 1.02 | +5.2 |
| 13 | 92 | 574 | 44 | 0.5 | 0.09 | 1.02 | +5.2 |
| 14 | 93 | 624 | 44 | 0.6 | 0.08 | 1.00 | +6.2 |

The results of Table 5 show that Examples 10, 11 and 12 are those where the best stability is achieved, while providing very acceptable hues of colour in reflection, since they avoid reflection in the red range. In the case of Examples 12 and 14 the colour in reflection is highly acceptable, however the stability here is slightly less favourable, although it remains within the desired performance limits for the glazing. Production on an industrial scale is the most favourable in Example 10. Hence, a good compromise has been sought between the materials of the layers and their relative thicknesses, on the one hand, and the feasibility on an industrial scale (productivity gains, costs, ease of production etc.), on the other hand.

The results of Table 6 clearly indicate the performance levels achieved for these triple glazing units, in particular in terms of the WER, which are all positive.

Glazing systems available on the market will be firstly be looked at for the purposes of comparison. Example G: glass/$SiO_x$/$SnO_2$:F (300 nm) and Example H: glass/$SiO_x$/$SnO_2$:F (450 nm). Table 7 gives the values for SF, emissivity and WER for double glazing units produced from such lamination structures.

TABLE 7

| Example | $SiO_x$ (nm) | $SnO_2$:F (nm) | $SiO_2$ (nm) | Emissivity | U(double glazing) 4 mm/15 mm-90% Ar/4 mm (W/$m^2 \cdot$ K) | SF (%) | WER (kWh/$m^2$/year) |
|---|---|---|---|---|---|---|---|
| G | 75 | 320 | 0 | 0.15 | 1.13 | 63.5 | −4.2 |
| H | 75 | 450 | 0 | 0.10 | 1.05 | 63.5 | −0.1 |

The results of measurements of these parameters show that the desired properties were not obtained as the WER values are negative.

The invention claimed is:

1. A transparent glass substrate having a coating comprising, in the following order:
   a first layer for neutralising colours in reflection,
   a second layer with low emissivity consisting essentially of $SnO_2$:F with a thickness in the range of between 455 and 800 nm, and
   a third layer consisting essentially of $SiO_x$, wherein x is less than or equal to 2, with a thickness in the range of between 40 and 65 nm or between 140 and 180 nm.

2. The glass substrate according to claim 1, wherein the first neutralisation layer is a mono-layer consisting essentially of silicon oxynitrides of formula $SiO_xN_y$, or silicon oxycarbides of formula $SiO_xC_y$,
   wherein
   x is less than 2,
   a refractive index thereof is from 1.65-1.75, and
   a thickness of the mono-layer is between 55 and 95 nm.

3. The glass substrate according to claim 1, wherein the first neutralisation layer is a dual layer consisting of a layer of $TiO_2$ arranged on the glass substrate, which is coated with a layer of silicon oxide, silicon oxycarbide $SiO_xC_y$, or silicon oxynitride $SiO_xN_y$,
   wherein
   x is less than or equal to 2,
   a thickness of $TiO_2$ is between 5 and 15 nm, and
   a thickness of silicon oxide, oxycarbide or oxynitride is between 15 and 40 nm.

4. The glass substrate according to claim 1, wherein the first neutralisation layer is a dual layer consisting of a layer of $SnO_2$ or ZnO arranged on the glass substrate, which is coated with a layer of silicon oxide, silicon oxycarbide $SiO_xC_y$, or silicon oxynitride $SiO_xN_y$,
   wherein x is less than or equal to 2,
   a thickness of $SnO_2$ or ZnO is between 15 and 35 nm, and
   a thickness of silicon oxide, oxycarbide or oxynitride is between 15 and 40 nm.

5. The glass substrate according to claim 1, wherein
   the first neutralisation layer is a mixed layer consisting essentially of oxides of Sn and Si, and
   a thickness of the first neutralisation layer is between 55 and 95 nm.

6. The glass substrate according to claim 1, wherein the thickness of the second layer with low emissivity is between 455 and 740 nm.

7. The glass substrate according to claim 1, wherein the third layer consisting essentially of $SiO_x$ has a thickness in the range of between 43 and 60 nm.

8. A double glazing unit comprising two transparent glass substrates, one of which is a glass substrate according to claim 1, which has a U of ≤1.4 W/$m^3 \cdot$K, an emissivity of less than or equal to 0.12, and a solar factor value of at least 73%.

9. The double glazing unit according to claim 8, wherein the glazing unit has a solar factor value of between 75% and 81%.

10. The double glazing unit according to claim 8, wherein the glazing unit has a value for $\Delta a*b*$ of 3.5 at most.

11. A window comprising a reference frame and a double glazing unit according to claim 8, which has a WER with values higher than or equal to zero kWh/$m^2$/year.

12. A triple glazing unit comprising three transparent glass substrates, at least one of which is a glass substrate according to claim 1, which has a U of ≤1.1 W/$m^3 \cdot$K, an emissivity of less than or equal to 0.12 and a solar factor value of at least 64%.

13. The triple glazing unit according to claim 12, wherein the glazing unit has a solar factor value in the range of between 65% and 75%.

14. The triple glazing unit according to claim 12, wherein the glazing unit has a value for $\Delta a*b*$ of 3.5 at most.

15. A window comprising a reference frame and a triple glazing unit according to claim 12, which has a WER with values higher than or equal to zero kWh/$m^2$/year.

16. The glass substrate according to claim 1, wherein the third layer has a thickness of between 40 and 65 nm.

17. The glass substrate according to claim 1, wherein the third layer has a thickness of between 140 and 180 nm.

18. The window according to claim 11, wherein the double glazing unit has a WER value of between 1 and 10 kWh/$m^2$/year.

19. The window according to claim 15, wherein the triple glazing unit has a WER value of between 1 and 10 kWh/$m^2$/year.

* * * * *